Feb. 4, 1964  H. F. WALLEN  3,120,402
LOCK RING JOINT FOR CYLINDRICAL PIPES AND CASINGS
Filed April 11, 1960  3 Sheets-Sheet 1

INVENTOR.
HORACE F. WALLEN
BY
Knox & Knox

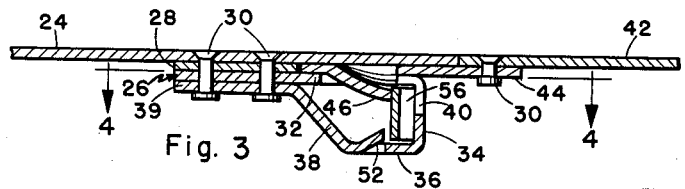
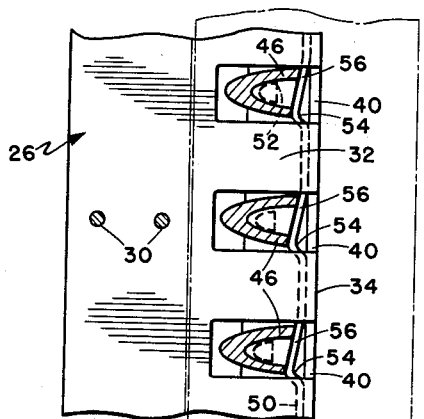
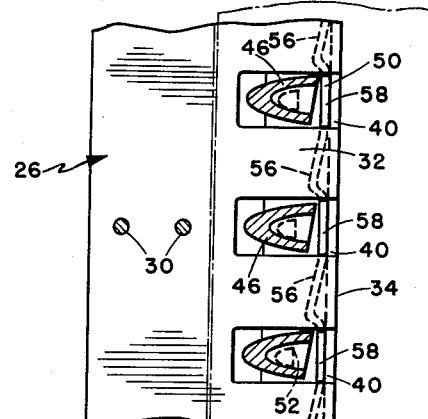
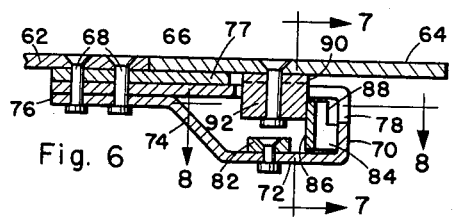
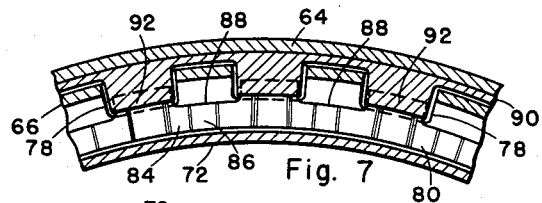
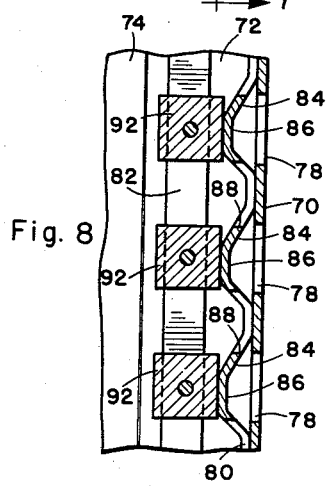
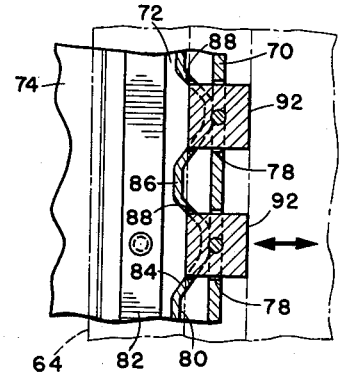

Feb. 4, 1964 H. F. WALLEN 3,120,402
LOCK RING JOINT FOR CYLINDRICAL PIPES AND CASINGS
Filed April 11, 1960 3 Sheets-Sheet 3
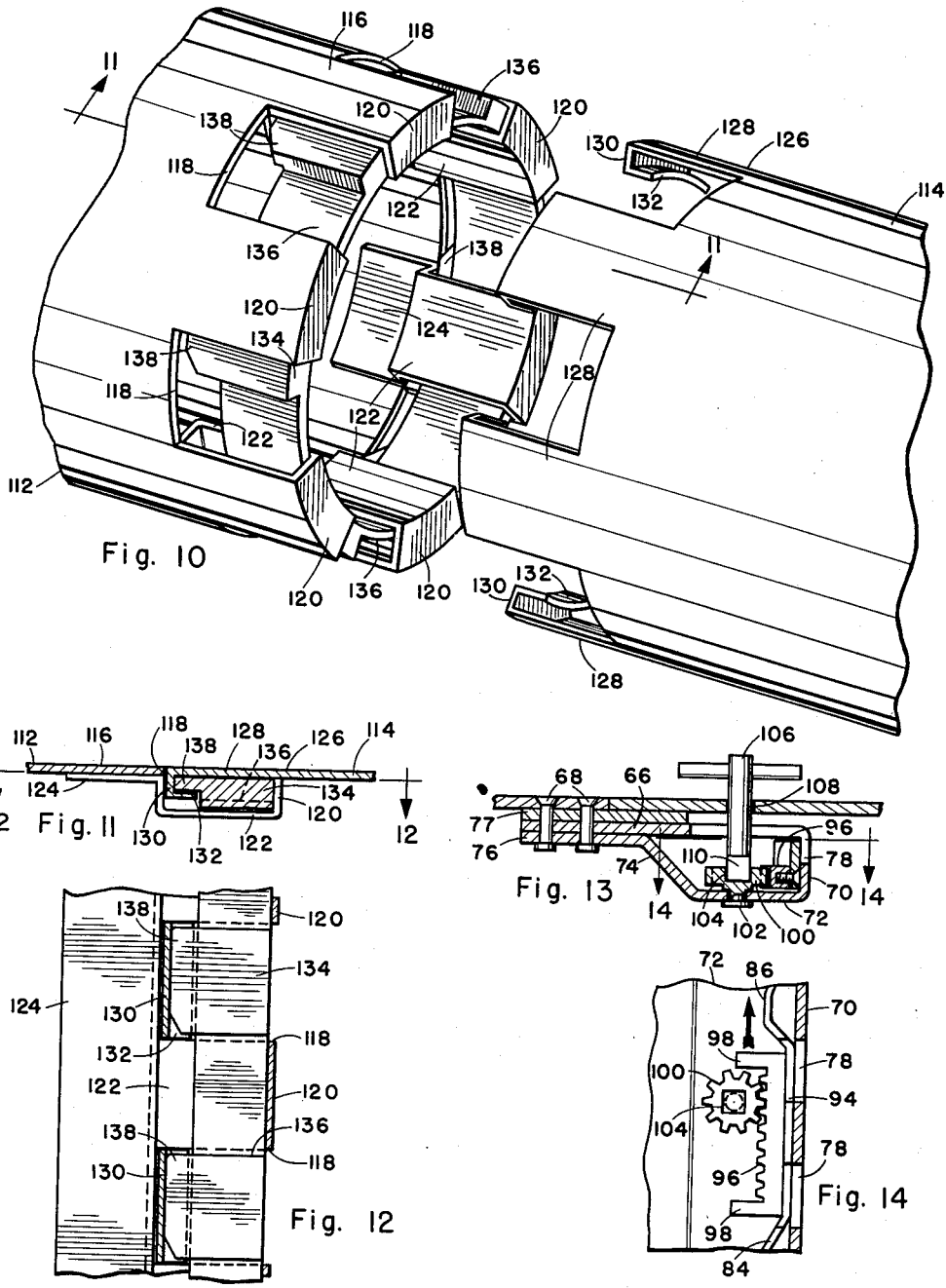
INVENTOR.
HORACE F. WALLEN
BY
Knox & Knox

United States Patent Office 3,120,402
Patented Feb. 4, 1964

3,120,402
LOCK RING JOINT FOR CYLINDRICAL
PIPES AND CASINGS
Horace F. Wallen, San Diego, Calif., assignor to The
Ryan Aeronautical Co., San Diego, Calif.
Filed Apr. 11, 1960, Ser. No. 21,419
6 Claims. (Cl. 285—305)

The present invention relates generally to couplings and more particularly to a lock ring joint for cylindrical pipes and casings.

The primary object of this invention is to provide a lock ring joint with which the ends of two cylindrical pipes or casings can be securely locked together by a very small rotary motion of the locking ring and can just as easily be disconnected by a reverse rotary motion of the locking ring.

Another object of this invention is to provide a lock ring joint having multiple inter-engaging elements which are held by a single locking ring.

Another object of this invention is to provide a lock ring joint in which the inter-engaging elements ensure positive and accurate alignment of the two pipes or casings.

A further object of this invention is to provide a lock ring joint which is adaptable to many sizes of pipes and to large cylindrical casings, and may be made from various materials for lightness, heat resistance, or other specific characteristics.

Finally, it is an object to provide a lock ring joint of the aforementioned character which is simple and convenient to operate and which will give generally efficient and durable service.

With these and other objects definitely in view, this invention consists in the novel construction, combination and arrangement of elements and portions, as will be hereinafter fully described in the specification, particularly pointed out in the claims, and illustrated in the drawings which form a material part of this disclosure, and in which:

FIGURE 3 is a sectional view taken on the line 3—3 of FIGURE 2, showing the joint locked;

FIGURE 4 is a fragmentary sectional view taken on the line 4—4 of FIGURE 3;

FIGURE 5 is a sectional view similar to FIGURE 4, with the joint unlocked;

FIGURE 6 is a sectional view similar to FIGURE 3, showing a modified form of the structure;

FIGURE 7 is a fragmentary sectional view taken on the line 7—7 of FIGURE 6;

FIGURE 8 is a sectional view taken on the line 8—8 of FIGURE 6;

FIGURE 9 is a sectional view similar to FIGURE 8, showing the joint unlocked and partially separated;

FIGURE 10 is a perspective view of a modified form of the structure, the joint being separated;

FIGURE 11 is a fragmentary sectional view taken on the line 11—11 of FIGURE 10;

FIGURE 12 is a fragmentary sectional view taken on the line 12—12 of FIGURE 11;

FIGURE 13 is a sectional view similar to FIGURE 6, showing one means for rotating the locking ring; and FIGURE 14 is a fragmentary sectional view taken on the line 14—14 of FIGURE 13.

Similar characters of reference indicate similar or identical elements and portions throughout the specification and throughout the views of the drawings.

Figure 1:
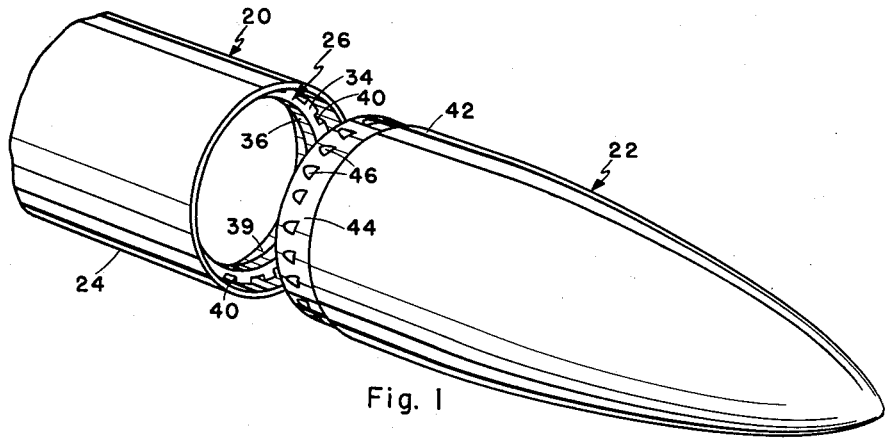
FIGURE 1 is a perspective view of a missile nose assembly incorporating the lock ring joint, the portions being shown separated.
Figure 2:
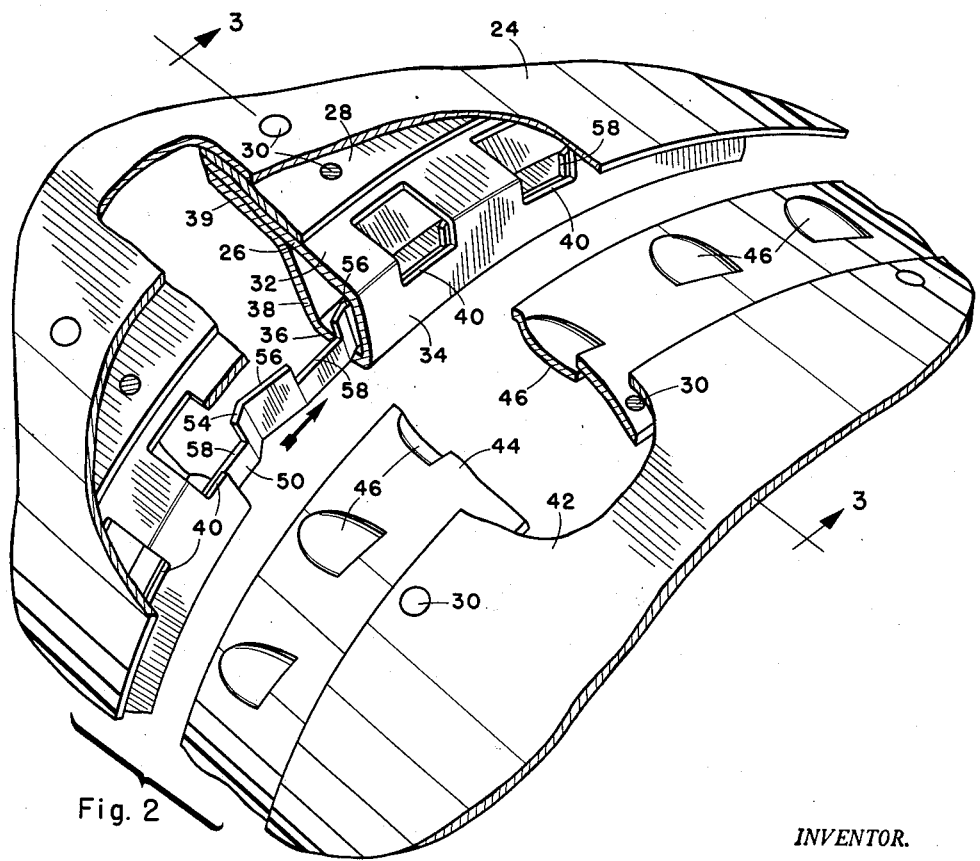
FIGURE 2 is an enlarged, fragmentary perspective view of the separated joint, portions being cut away.

Referring now to FIGURES 1–5 of the drawings, the joint is illustrated as applied to a missile having a first body 20 and a second body or nose section 22, the joint being used to connect the two parts and facilitate rapid attachment of various payloads. It should be understood that this is merely one example of the use of the lock joint, which happens to be particularly suitable for such a purpose.

The body 20 has a cylindrical outer casing 24 adjacent one end of which is an internal, concentric retaining ring 26, separated from said casing by an intermediate spacing ring 28. The structure may be secured by rivets 30, or any other suitable fastening means. The retaining ring 26 has a support portion 32 extending axially forwardly beyond the spacing ring 28, the periphery of said support portion having a radially inwardly extending end wall 34, the inner edge of which has a rearwardly turned inner flange 36 concentric with said support portion. For additional rigidity, the inner flange 36 is provided with an outwardly offset portion 38 and doubler flange 39, which is secured by the rivets 30. The outer portion of the end wall 34 has a plurality of peripherally spaced notches 40 which extend longitudinally into the support portion 32 and are slightly narrower than the spaces therebetween, said notches preferably being evenly spaced, although special spacing may be used for indexing purposes.

The nose section 22 has a cylindrical casing 42, suitably tapered in aerodynamic configuration, the large open end thereof being equal in diameter to the casing 24 and having a connecting ring 44 fixed therein. The connecting ring 44 is secured internally to the casing 42 by rivets 30 or the like, and extends axially beyond said casing, said connecting ring having a plurality of inwardly projecting lugs 46, circumferentially spaced for alignment with the notches 40. As illustrated, the lugs 46 are formed integrally with the connecting ring 44 by displacing portions of the material inwardly in the manner of small louvers, but separate lugs may be attached to the connecting ring as an alternative. The connecting ring 44 is dimensioned to fit between the casing 24 and the retaining ring 26, the spacing ring 28 being substantially equal in thickness to said connecting ring.

The retaining ring 26 is provided with a locking ring 50 mounted concentrically therein and being rotatable around the inner flange 36, said locking ring being held against axial displacement by a plurality of outwardly protruding detents 52 formed in said inner flange, so that said locking ring is in sliding contact with the end wall 34. The locking ring 50 is made from sheet material and is generally planar radially of the axis of body 20, said locking ring having a plurality of circumferentially spaced cam portions 54 offset from the general plane thereof on the side remote from end wall 34, said cam portions having ramps 56. The cam portions 54 are spaced to correspond with the spacing of lugs 46 and between the cam portions, the locking ring 50 is provided with notches 58 corresponding to the notches 40. For maximum area of contact, the lugs 46 are angularly cut to correspond with the angle of ramps 56 to make substantially total contact therewith.

In the unlocked position the locking ring 50 is oriented to align the notches 58 with the notches 40, the connecting ring 44 is inserted into the casing 24, the lugs 46 passing through the corresponding notches until the casings 24 and 42 meet, as in FIGURE 3. In this position, the lugs 46 are disposed slightly beyond the plane of the locking ring 50, as in FIGURE 5, said locking ring then being rotated substantially the width of one cam portion 54 to move all of the ramps 56 into firm contact with said lugs, as in FIGURE 4.

The structure is readily adaptable to pipes, conduits or other types of cylindrical members which must be securely joined or disconnected rapidly. The number, size and spacing of the lugs 46 and the corresponding notches and cam portions are dependent on the dimensions of the members to be joined and can be varied considerably.

A more compact structure is illustrated in FIGURES 6–9, in which a first body 62 and a second body 64 are joined, said first body having a retaining ring 66 extending axially from the end thereof and secured by rivets 68. The retaining ring 66 has an inwardly radially disposed end wall 70 having a returned inner flange 72, said inner flange having an outwardly offset portion 74 with a doubler flange 76 which is also secured by the rivets 68, the structure forming an extremely rigid, enclosed ring member. Again it should be understood that the specific configuration and the stress characteristics of the retaining ring 66 are dependent on the particular application of the joint. The retaining ring 66 is spaced inwardly from the body 62 by a spacing ring 77 extending axially beyond the end of said body. The outer portion of the end wall 70 has a plurality of peripherally spaced notches 78 which extend longitudinally into the retaining ring 66 and mounted in the retaining ring is a locking ring 80, concentric with and rotatable around the inner flange 72, said locking ring being retained adjacent said end wall by a detent ring 82 fixed to the inner flange. The locking ring 66 has a plurality of circumferentially spaced, resilient cam portions 84 offset on the side remote from the end wall 70, said cam portions having flattened peaks 86, while between the cam portions are notches 88 corresponding to the notches 78.

The second body 64 is fitted with a connecting ring 90 secured internally thereto by further rivets 68, said connecting ring being spaced axially inwardly from the end of the body. The connecting ring 90 has a plurality of circumferentially spaced, inwardly projecting lugs 92 of generally rectangular configuration, said connecting ring being cast or machined as a solid unit for maximum strength.

For assembly, the locking ring 80 is turned to the unlocked position to align the notches 88 with the notches 78, allowing the lugs 92 to pass through the notches when the bodies 62 and 64 are connected, as in FIGURE 9. In the assembled position, the end of the second body 64 fits closely over and is supported by the extension of the spacing ring 77, as in FIGURE 6, the locking ring 80 being rotated to bring the flattened peaks 86 of cam portions 84 to bear on the lugs 92, thus locking the structure in place.

Various means may be used to operate the locking ring, one particularly suitable mechanism being illustrated in FIGURES 13 and 14, as applied to the structure of FIGURE 6. The locking ring 80 has a flattened portion 94 to which is fixed a short gear rack 96 having extended stops 98 at both ends. The omission of one cam portion to accommodate the rack 96 is inconsequential in medium or large sized cylindrical joints. Mounted on the inner flange 72 is a pinion 100 meshing with the rack 96, said pinion being rotatable on a pin 102. The pinion 100 is provided with a non-circular socket 104 to receive a key 106 inserted through a small opening 108 in the body 64, said key having an end plug 110 to fit said socket. A rotary motion of the key 106 thus turns the locking ring 80 the small amount necessary to engage the cam portions 84, the only external indication of the mechanism being the opening 108. For smaller or simplified joints a short radial arm attached to the locking ring and extending through a suitable slot may be used, other comparable mechanisms being obvious to those skilled in the art.

A further simplified form of the structure is illustrated in FIGURES 10–12, in which a first body 112 and a second body 114 have the interconnecting portions formed integrally therewith. The first body 112 has an end portion which comprises a retaining ring 116 and is provided with a plurality of deep notches 118, the portions of said retaining ring between the notches having inwardly extending end wall 120, the inner ends of which are turned longitudinally to form inner flanges 122 spaced from and generally parallel to said retaining ring. The ends of the inner flanges 122 are offset outwardly and secured to the body 112 as doubler portions 124, for added rigidity.

The second body 114 has an end portion which comprises a connecting ring 126, said connecting ring having a plurality of longitudinally extending fingers 128 which fit closely into the notches 118 to form a smooth continuation of the outer surface of the connected body members. The ends of fingers 128 have inwardly extending wall portions which serve as lugs 130, the inner ends of which have returned flange portions 132.

Rotatably mounted in the retaining ring 116 is a locking ring 134 having a plurality of notches 136 corresponding to the notches 118, the portions of said locking ring between the notches projecting longitudinally therefrom on the side remote from the end walls 120 and comprising cam portions 138. When locking ring 134 is in unlocked position with the notches 136 aligned with notches 118, the fingers 128 can be inserted through the notches to connect the two bodies 112 and 114. The locking ring 134 is then rotated slightly, by any suitable means as previously described, to bring the cam portions 138 between the fingers 128 and flange portions 132, with the ends of said cam portions bearing on lugs 130 and locking the bodies firmly together, as in FIGURES 11 and 12.

This latter structure eliminates the need for additional parts and incorporates the interconnecting elements into the cylindrical members themselves, the only separate part being the movable locking ring. It should be noted, however, that in each form of the structure, interconnection is made by lugs on one cylindrical member inserted axially into notches on the other cylindrical member, the two being secured by limited rotation of a locking ring on the notched cylindrical member.

The arrangement and proportions of the various parts of the structure are dependent on the dimensions, materials and strength requirements of the cylindrical members to be joined. Connection and disconnection can be carried out in a minimum of time since the only operation required is a rotation of the locking ring through a peripheral distance substantially equal to the width of one notch in the retaining ring. The structure is applicable to many different uses, such as the joining of missile body components, connection or sections of a pipe or conduit, joining of cylindrical parts of prefabricated structures such as supporting columns or scaffolding, to mention but a few. While the structure is illustrated as used on the inside of cylindrical casings to obtain a smooth exterior, it will be obvious that the ring elements may just as easily be placed on the outside to obtain a smooth inner surface, such as for fluid carrying pipes or conduits. For instance, the structure illustrated in the views of FIGURES 3, 6 and 11 could be on either the inside or outside of the body walls.

The operation of this invention will be clearly comprehended from a consideration of the foregoing description of the mechanical details thereof, taken in connection with the drawings and the above recited objects. It will be obvious that all said objects are amply achieved by this invention.

It is understood that minor variation from the form of the invention disclosed herein may be made without departure from the spirit and scope of the invention, and that the specification and drawings are to be considered as merely illustrative rather than limiting.

I claim:
1. A lock joint for cylindrical pipes and casings, comprising: a first cylindrical body having a retaining ring at one end thereof; said retaining ring having a generally radially inwardly extending end wall and an inner flange portion spaced from and concentric with the first body; said retaining ring having a plurality of circumferentially spaced notches extending into said end wall; a second cylindrical body having a connecting ring at one end thereof; said connecting ring being engageable with said retaining ring and having a plurality of inwardly projecting lugs spaced to fit into said notches; a locking ring mounted in said retaining ring and being rotatable around said inner flange portion; detent means on said inner flange portion to hold said locking ring against axial displacement; said locking ring having a plurality of notches corresponding to said first mentioned notches for alignment therewith in one, unlocked position of the locking ring to provide clearance for said lugs; said locking ring having axially offset, substantially resilient cam portions spaced to engage said lugs collectively when the locking ring is rotated to another, locked position; and means to shift said locking ring between locked and unlocked positions.

2. A lock joint for cylindrical pipes and casings, comprising: a first cylindrical body having a retaining ring fixed internally thereto adjacent one end; a spacing ring fixed between said first body and said retaining ring and spacing the retaining ring concentrically from the body; a second cylindrical body having a connecting ring fixed internally thereto and extending from one end; said connecting ring being dimensioned to fit closely between said retaining ring and said first body; said retaining ring having a plurality of circumferentially spaced notches therein; said connecting ring having a plurality of inwardly projecting lugs spaced to fit into said notches; a locking ring rotatably mounted on said retaining ring and having a plurality of cam portions spaced to engage said lugs collectively in one, locked position of the locking ring; and means to shift said locking ring to another, unlocked position to release said cam portions from said lugs.

3. A lock joint for cylindrical pipes and casings, comprising: a first cylindrical body having a retaining ring fixed internally thereto adjacent one end; a spacing ring fixed between said first body and said retaining ring and spacing the retaining ring concentrically from the body; a second cylindrical body having a connecting ring fixed internally thereto and extending from one end; said connecting ring being dimensioned to fit closely between said retaining ring and said first body; said retaining ring having a generally radially inwardly extending end wall and an inner flange portion spaced from and concentric with said first body; said retaining ring having a plurality of circumferentially spaced notches extending to said end wall; said connecting ring having a plurality of inwardly projecting lugs spaced to fit into said notches; a locking ring mounted in said retaining ring and being rotatable around said inner flange portion; detent means on said inner flange portion to hold said locking ring against axial displacement; said locking ring having a plurality of notches corresponding to said first mentioned notches for alignment therewith in one, unlocked position of the locking ring to provide clearance for said lugs; said locking ring having axially offset cam portions spaced to engage said lugs collectively when the locking ring is rotated to another, locked position; and means to shift said locking ring between locked and unlocked positions.

4. A lock joint for cylindrical pipes and casings, comprising: a first cylindrical body having a retaining ring fixed internally thereto adjacent one end; a spacing ring fixed between said first body and said retaining ring and spacing the retaining ring concentrically from the body; said spacing ring extending axially from said first body; a second cylindrical body dimensioned to fit closely over said extended spacing ring and abut said first body; said retaining ring extending axially beyond said spacing ring and having a plurality of circumferentially spaced notches therein; a connecting ring fixed internally to said second body and having a plurality of inwardly projecting lugs spaced to fit into said notches; a locking ring rotatably mounted on said retaining ring and having a plurality of cam portions spaced to engage said lugs collectively in one, locked position of the locking ring; and means to shift said locking ring to another, unlocked position to release said cam portions from said lugs.

5. A lock joint for cylindrical pipes and casings, comprising: a first cylindrical body having a retaining ring fixed internally thereto adjacent one end; a spacing ring fixed between said first body and said retaining ring and spacing the retaining ring concentrically from the body; a second cylindrical body dimensioned to fit closely over said extended spacing ring and abut said first body; said retaining ring extending axially beyond said spacing ring and having a generally radially inwardly extending end wall and an inner flange portion spaced from and concentric with the first body; said retaining ring having a plurality of circumferentially spaced notches extending into said end wall; a connecting ring fixed internally to said second body and having a plurality of inwardly projecting lugs spaced to fit into said notches; a locking ring mounted in said retaining ring and being rotatable around said inner flange portion; detent means on said inner flange portion to hold said locking ring against axial displacement; said locking ring having a plurality of notches corresponding to said first mentioned notches for alignment therewith in one, unlocked position of the locking ring to provide clearance for said lugs; said locking ring having axially offset, substantially resilient cam portions spaced to engage said lugs collectively when the locking ring is rotated to another, locked position; and means to shift said locking ring between locked and unlocked positions.

6. A lock joint for cylindrical pipes and casing, comprising: a first cylindrical body and a second cylindrical body; one end of said first body constituting a retaining ring and having a plurality of circumferentially spaced notches therein; one end of said second body constituting a connecting ring and having a plurality of finger elements spaced to fit closely into said notches and form a smooth continuation of the connected bodies; said finger elements having inwardly projecting lugs thereon; said lugs having returned flanged portions spaced inwardly from said finger elements; a locking ring rotatably mounted in said retaining ring; said locking ring having notches therein corresponding to said first mentioned notches for alignment therewith in one, unlocked position of the locking ring to provide clearance for said lugs; said locking ring having axially extending cam portions spaced to engage said lugs collectively between said flanged portions and said finger elements in another, locked position of the locking ring; and means to shift said locking ring between locked and unlocked positions.

References Cited in the file of this patent

UNITED STATES PATENTS

| | | |
|---|---|---|
| 820,437 | Pehrson | May 15, 1906 |
| 1,663,755 | Gammeter | Mar. 27, 1928 |
| 1,915,014 | Carter | June 20, 1933 |
| 2,936,093 | Passalaqua | May 10, 1960 |